(12) United States Patent
Seguin

(10) Patent No.: US 6,168,676 B1
(45) Date of Patent: Jan. 2, 2001

(54) RAIL REFURBISHING PROCESS

(76) Inventor: Herb J. J. Seguin, 12639- 52 Ave., Edmonton, Alberta (CA)

(*) Notice: Under 35 U.S.C. 154(b), the term of this patent shall be extended for 0 days.

(21) Appl. No.: 07/882,928

(22) Filed: May 14, 1992

Related U.S. Application Data

(63) Continuation-in-part of application No. 07/431,084, filed on Nov. 3, 1989, now abandoned, which is a continuation-in-part of application No. 07/108,638, filed on Oct. 15, 1987, now abandoned.

(30) Foreign Application Priority Data

Oct. 31, 1986 (GB) .................................................. 9626051

(51) Int. Cl.$^7$ ...................................................... C21D 9/08
(52) U.S. Cl. ........................... 148/525; 148/512; 148/569
(58) Field of Search ................................... 148/512, 516, 148/525, 569

(56) References Cited

U.S. PATENT DOCUMENTS

| 4,015,100 | * | 3/1977 | Gnanamuthu et al. | 148/903 |
| 4,201,602 | * | 5/1980 | Shupe | 148/146 |
| 4,458,125 | | 7/1984 | Leis | 219/10.14 |

FOREIGN PATENT DOCUMENTS

| 860643 | 1/1978 | (BE) . |
| 56-17586903 | 5/1983 | (JP) . |

OTHER PUBLICATIONS

Steen and Weerasinghe, "The laser's other role", welding and metal fabrication, Nov., 1983, p. 453.

Clayton, et al., "Surface Damage Phenomena in Rails", International Symposium on Contact Mechanics and Wear of Rail/Wheel Systems, note Sep., 1982.

Marich, "Rail wear/fatigue limits", Track Technology, Dec. 1985.

Masumoto, "Some Features and Metallurgical Considerations of Surface Defects in Rail Due to Contact Fatigue", in Rail Steels–Developments, Processing, and Use, Dec. 1976.

Wesselmann, "Track: Programming for Productivity", Motor and Railroads, Nov. 1985.

Armstrong, "Rail: The point of the pyramid", Railway Age, Sep., 1984.

Merchant, "A Comparative Analysis of Laser Welding Performance", in Industrial Laser Handbook. Dec. 1990.

Mazumder, "Laser Welding", Dec. 1990.

Kalousek, "Wear and Contact Fatigue Model For Railway Rail", Technical Report, National Research Council of Canada, Oct., 1986.

Article entitled: "NRC railway maintenance technique to triple rail line", Design Engineering, Jan. 1989.

Kalousek, "Keeping heavy haul track corrugation–free", Railway Gazette International, Aug. 1989.

Globe and Mail Article titled: "Metallurgists are still on the track of better steel rails" Dec. 1990.

* cited by examiner

*Primary Examiner*—Scott Kastler
(74) *Attorney, Agent, or Firm*—Anthony R. Lambert

(57) ABSTRACT

A method and apparatus for repairing microcracks in the metal of a railway track. A high power laser, or equivalent energy beam generator, is moved along a track. The high power laser directs an intense beam of energy towards microcracks in the rail, a vapour space is formed in the metal of the rail, and as the laser beam moves on, the metal resolidifies and repairs the microcracks. Fusible metal may be applied to the vapour space to improve the strength and control the microstructure of the solidified metal. Preheating and controlled quenching may improve the crystalline microstructure of the metal after the vapour space has been formed, and, if necessary, the rail may be ground to a smooth finish. A plurality of repaired regions having deep roots are locked in the rail using unaffected metal between them.

4 Claims, 6 Drawing Sheets

RAIL REFURBISHING PROCESS

CROSS-REFERENCE TO RELATED APPLICATIONS

This application is a continuation-in-part of application Ser. No. 07/431,084, filed Nov. 3, 1989, now abandoned which is a continuation-in-part of application ser. No. 07/108,638, filed Oct. 15, 1987, now abandoned.

FIELD OF THE INVENTION

This invention relates to methods and apparatus for the reconstitution of metal that includes microfractures, and more particularly the metal of a rail of a railway track or a wheel of a rail vehicle.

BACKGROUND AND SUMMARY OF THE INVENTION

The deterioration of railroad rail and wheel surfaces (the rail-wheel problem) is generally caused by two mechanisms of material removal. These occur at the wheel and rail contact points. The two processes are (1) microscopic material loss due to friction generated abrasion; and (2) macroscopic material loss due to flaking, spalling and shelling.

The first mechanism, friction generated abrasion, results in a gradual loss of surface material predominantly on the wheel flanges and inside surfaces of the high rail; particularly on curves. This type of frictional wear can result in very rapid rail and wheel deterioration if lubrication is not present. This aspect has now become particularly troublesome with the ever increasing appearance of heavily loaded unit trains.

This being the case, automatic flange-lubricators are increasingly being installed on railroad lines, particularly before sharp curves. Lubrication of the wheel flange and inside rail surface has resulted in an extension of the useful lifetime of these items by as much as a factor of three. An additional but equally important side benefit that has been realized by rail lubrication is a near 30% reduction in fuel costs for the prime mover. Consequently, rail lubrication is rapidly becoming a universally accepted procedure.

However, the second type of material removal, generally categorized by descriptive terms such as dandruff, flaking, spalling and shelling, can be a much more rapid and debilitating process (once it has started), since unlike the case of microscopic abrasive wear, relatively large particles of material are dislodged.

The term dandruff is characterized by the generation of small particles, typically less than 1 or 2 square mm in area and perhaps a maximum of 0.1 mm thick. In flaking, the particle size ranges up to about 1 or 2 square cm in area and up to 1 mm in thickness. Spalling and shelling usually refer to the generation and loss of surface particulates that are larger still.

As might be expected, this second type of material loss can be very detrimental to rail service, since once it has started it progresses very rapidly. This follows as a consequence of the large nonuniformity created in the rail-wheel contact surface by the loss of a flake. The condition results in impact loading of the members, accompanied by a further acceleration in the phenomenon. The generation of corrugations is often a subsequent symptomatic feature of this flaking deterioration process. These phenomena generally affect both wheel and rail members with equal severity.

In certain instances, microcracks can propagate large distances in the horizontal plane and then suddenly execute a 90° turn into the bulk material. Such a phenomenon can quickly lead to very deep vertical cracks developing into the bulk rail member. This process commonly known as a squat, can if not detected and repaired, subsequently lead to a very serious complete transverse break in the rail track.

As of the present time there has been no effective in situ remedy for these flaking, shelling or squat processes, other than to grind off the top of the rail head and wheel surfaces to a considerable depth. Grinding is an expensive process and, because of the loss of rail material, requires replacement of the entire rail about every seven years. In many cases companion microcracks propagate deep within the bulk material and the items must then be replaced.

Experiment has shown that the reason for the development of this flaking or shelling phenomenon, which has become much more severe now that lubrication has been adopted, is due to the propagation of fatigue-generated microcracks.

Because of a significant overstressing with concomitant yielding and plastic flow of the members, the maximum stress usually does not occur at the surface, but rather at a plane a few mm below the cap.

In particular, since the individual wheel loading is now typically 32,000 pounds and further since the vertical contact area is generally only about the size of a dime (about 1 square cm in area), the stress to which the steel rail and wheel material is subjected is in the range of 150,000 to 200,000 psi. As a consequence the surface material on both rail and wheel is cyclically loaded far beyond its elastic limit, upon passage of each train wheel. The process gradually causes cyclic stress fatigue of the surface and near-surface material, which in turn leads to the formation of a large number of microcracks.

If these cracks remain dry the coefficient of friction within them will stay at about 0.5. Since the coefficient of friction at the rail-wheel interface is typically only about 0.3 for dry rail and still less at 0.18 for lubricated rail, these microcracks are locked in somewhat and do not propagate excessively due to tip stress concentration.

However, when the track inside face is lubricated, grease invariably migrates onto the surface of the rail head also. This grease is in turn gradually forced into these microcracks; thereby also lowering their coefficient of friction to 0.18. Thus if the rail-wheel interface ever becomes nonlubricated or dry, a situation soon develops whereby the coefficient of friction in the microcrack is considerably lower than that at the rail surface.

This condition permits lateral differential movement of the sides of the microcrack with the generation of a concomitant extreme stress concentration at the crack tip. The situation leads to rapid crack propagation in a direction parallel to the rail top surface. Ultimately these cracks propagate large horizontal distances just beneath the surface; and thereby produce large area thin flakes, which eventually become dislodged. The process leaves behind a relatively deep depression in the rail-wheel interface.

The occurrence of such defects accelerates the propagation of other microcracks due to the impact loading effect from the nonuniform surface. Once the flaking process has started, quick rail and wheel grinding is mandatory; otherwise the phenomenon will rapidly deteriorate these members to a nonserviceable condition.

As noted above, grinding of the rail surface below the microcracks is the only known solution to the problem. But this is expensive both due to the cost of servicing and using grinding equipment and the need for eventual replacement of the entire rail.

Melting and solidification of the rail in situ, for example by induction heating, has also been considered as a solution, but this method has been rejected as a practical solution for a number of reasons, the most important of which is the impossibility of selectively heating only the cracked part of the rail. Simply put, induction heating melts the entire rail, leaving it a formless blob.

Solutions to the rail wheel interface problem must also meet constraints imposed by limitations on track access time on busy rail lines. Track access time is a parameter of major importance in the rail industry. Consequently, the application speed or processing rate of any in situ rail refurbishing activity is an important factor in the development of the specifics of that process.

Because of this dominating processing-rate constraint, and the large depth-of-penetration required for effectiveness to be discussed further below, relatively slow and very shallow laser surface cladding process are not believed useful for solving the problem.

As a first consideration, the minimum acceptable processing speed (from a track access time consideration) is about one meter per second. Secondly, because of extreme loading at the rail-wheel interface contact point, stress concentrations far beyond the elastic limit of the rail steel extend deep below the rail surface. Thus, to prevent a pealing-off or de-lamination of the processed region under heavy cyclic loading in subsequent service, it is believed essential that the boundary or depth-of-penetration of the refurbished section be below the rail head surface, typically between 5 to 10 mm.

A close examination of the above limiting considerations reveals that any commercially viable heating process must be capable of enormous power deposition deep within the rail head. Considerations of both the specific heat and volume of steel that must be melted per unit time (at least 100 cc/sec. per channel), reveals that an energy transfer rate of about 200 kW per rail is required to achieve a minimal acceptable process rate. This value together with the thermal conductivity of rail steel, (500 j/sec/degree C.), clearly shows that the required heat transfer rates are at least an order of magnitude beyond the capabilities of thermal conduction dominated laser heating approaches.

The inventor has found that at the minimally acceptable process speeds of interest (ie. 1m/s and preferably faster), the thermal conduction of steel is insufficient to permit melting of the rail head to the depths required for effective microcrack repair. Only a thin surface melting effect is obtained.

By contrast the inventor proposes that energy be deposited directly "inside" the rail head using a high power laser and moving the laser along the rail (or a wheel or some other such piece of metal that requires deep re-melting). This is achieved through the creation of a metal-free "vapor-space" region or more precisely a "vapor-hole", extending deep within the bulk rail steel. In this manner, laser energy is deposited directly by the laser beam itself, via a "laser-plasma interaction" between the laser photons and the metal vapor.

Specifically, above a specific laser power density threshold of several million watts per square centimeter, the beam intensity is sufficient to create and maintain a small diameter opening or hole, extending a very large distance below the surface. As a consequence of this fact, the energy transfer mechanism changes abruptly from a "thermal-conduction" dominated process to a "laser-plasma" dominated process. Although the sidewalls of this opening are composed of liquid metal, the hole itself is kept clear, due to the hydrostatic pressure of laser-vaporized metal trapped within the narrow but deep opening. An illustrative mechanical analogy of this deep-penetration phenomenon is afforded by considering a high pressure air-jet emanating from a small aperture nozzle and impinging upon a free water surface. If the air-jet is very small in diameter and has sufficient pressure, a narrow hole is created in the water surface and extends to a considerable depth below its free surface.

As a consequence of this deep vapor hole, the laser beam can instantaneously penetrate far inside the rail head and thereby deposit melting energy at great depth. Consequently, energy transfer is no longer restricted by the thermal conductivity of the rail steel, but rather proceeds at a rate limited only by the power of the laser beam itself.

This high speed and deep penetration attribute is believed to be an essential requirement for the successful commercial implementation of any in situ laser rail microcrack repair service.

Another important aspect in the development of a successful in situ laser microcrack repair system is the rail steel itself. Specifically, because of long standing codes within the rail transport industry concerning wear and fatigue resistance of rails, such steels contain high carbon, sulfur, silicon and a number of rare earths as additives. In addition, all of the materials are present in different quantities in a particular rail section, depending on the particular manufacturer of the rail in question.

The inventor has discovered that some of these additives, and their variability from rail to rail, render railroad tracks very difficult to process at depth with any type of energy source, including lasers. In particular, these aspects lead to completely unacceptable results such as hot-cracking, chill-voids, chill-cracking and porosity. This aspect is in sharp contrast to low carbon steel, which has been documented to be very amenable to processing with lasers.

Consequently, to obtain acceptable and consistent results in the deep penetration of any arbitrary rails it is preferred that deep penetration alloying be used. In this approach a controlled amount of a chosen alloying material is added and thoroughly mixed with the molten metal surrounding the vapor hole deep inside the rail head. In this manner and upon resolidification, a high quality, defect-free zone or channel now replaces the previously microcrack damaged regions.

The inventor has found that consistent high quality results are not obtained unless the alloying material is thoroughly mixed with the base rail steel and extends to full depth throughout the melted channel. For this reason the alloying material preferably has low viscosity and preferably be added to the vapor hole region as a molten droplet.

Another important factor in the implementation of the invention is the "interface profile" between the processed rail material and the non-processed material. This transition region constitutes an interface region in which there is a gradual transition from the unaffected base material to the fully re-congealed region from the melted material. This transition region is a zone of rapidly changing crystal structure and concomitant internal stress. In any successful application of laser materials processing, and in particular this in situ rail refurbishing process, this interface or transition zone should be far below the area where significant contact rolling stress generated by the passing wheel penetrates.

Since in actual practise the rail-wheel interface is stressed far beyond its elastic limit, this cyclic rolling-contact stress penetrates far below the rail head surface (typically to a depth of several millimeters). This means that the melted zone interface should extend still further than this value; at least greater than 5 mm, but generally about 7 to 10 mm.

The inventor has also found that in order to prevent de-lamination of this processed zone, (a pealing out of the treated material under repeated cyclic stressing from each wheel), it is important that the interface profile between the bulk rail head and the refurbished zone not be straight. Thus, to accommodate this requirement our research has shown that it is important to refurbish the damaged area via a number of parallel stripes or channels, each having a long tail extending well back into the more ductile bulk steel of the rail head, thereby effectively "locking in" the stripes against the tri-axial stress generated by the wheel which attempts to cause plastic flow and concomitant de-lamination.

As indicated above, another important consideration in the technical feasibility of a successful laser rail refurbishing process is the heat affected zone (HAZ). Specifically, rail manufacturers expend major cost and effort to achieve a large grain pearlite microstructure throughout the rail head. This has been the case, since pearlite has historically exhibited superior toughness and serviceability under the cyclic rolling contact stressing, characteristic of the rail-wheel interface.

Thus, in order to retain these important characteristics of the processed rail, it is important that any in situ refurbishing process affect a minimum alteration to the microstructure in the surrounding non-processed portions of the rail head. For this reason any process which inherently leaves behind a wide heat-affected-zone will not be commercially acceptable. In this context the surface modification processes which rely on energy transfer by thermal conduction, will be unacceptable.

This aspect follows, since by definition thermal conduction transfers heat energy in three dimensions. Thus, to achieve a melted penetration depth of 5 to 10 means that the material will also be melted to a width of 10 to 20 mm. This aspect means an enormous and excessive heat input into the rail head; thereby producing a wide heat affected zone having poor fatigue and abrasive resistance.

The "vapor hole" energy deposition process of the present application however occurs so rapidly that thermal conduction to the surrounding regions is virtually eliminated. Thus, the non-processed surrounding bulk rail steel retains its desired pearlitic microstructure.

There is therefore proposed in one embodiment of the invention, a method of repairing cracks in the metal of a rail of a railway track or a wheel of a rail vehicle, the method comprising:

generating a plurality of intense beams of energy capable of generating a plurality of vapour spaces in the metal;

directing the plurality of intense beams of energy towards the cracks in the metal;

vaporising metal within the rail or wheel in the vicinity of the cracks to form a plurality of vapour spaces within the rail or wheel;

moving the beams of energy parallel to each other along the rail or wheel at a speed such that the metal surrounding the cracks melts when the intense beams of energy are directed towards the metal and solidifies after the intense beam of energy moves on to form a plurality of narrow strips of melted and solidified metal having roots extending into the metal of the rail or wheel; and the roots being separated by unaffected metal between the roots, thereby locking the plurality of strips of melted and solidified metal in the surface of the rail or wheel with unaffected metal between the narrow strips. Preferably the method includes depositing an alloying material within the vapour space to form a microstructure upon solidification of the alloying material that is compatible with the metal. A preferred such material is a duplex steel.

BRIEF DESCRIPTION OF THE DRAWINGS

There will now be described a preferred embodiment of the invention, with reference to the drawings, by way of illustration, in which like numerals denote like elements and in which.

14

Figure 7:
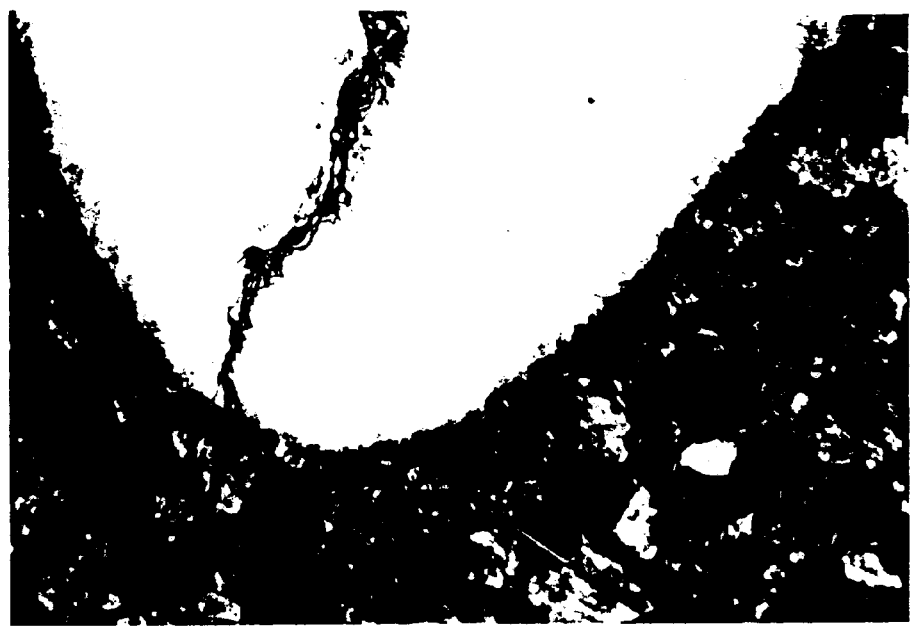
Figure 8:
Figure 9:
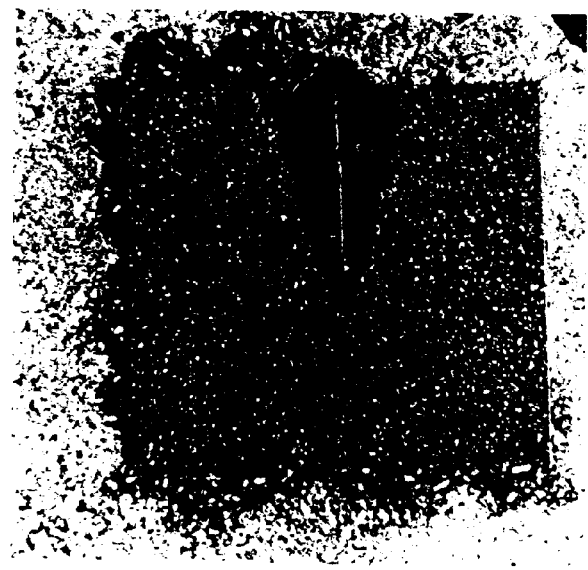

FIG. 7 is a high magnification metallographic cross-section of a laser treated rail sample having a chill crack defect;

FIG. 8 is a high magnification metallographic cross-section of a laser treated rail sample having a chill void defect; and FIG. 9 is high magnification cross-section of a non-alloyed, laser treated rail head sample exhibiting a hot cracking defect.

DETAILED DESCRIPTION OF PREFERRED EMBODIMENTS

In the following description, it is assumed that the apparatus for generating an energy beam includes a high-powered laser, specifically a $CO_2$ laser which generates an infra-red energy beam. However, it is considered that the laser apparatus could be replaced by other apparatus, for example that capable of generating an out-of-vacuum electron beam.

In order to accomplish the laser repair of railway tracks in accordance with this invention, it is considered desirable to process both rails simultaneously. This means that the vehicle will preferably have a duplicate set of equipment, one for each rail.

Figure 1:
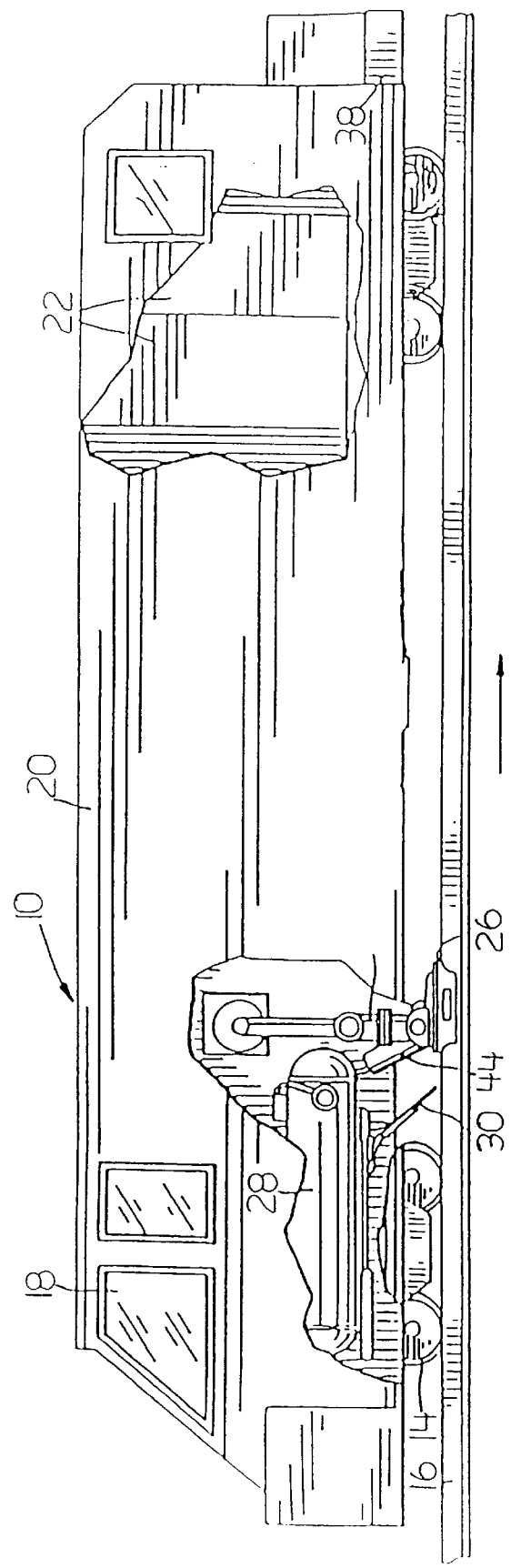
FIG. 1 is a side elevational view of a vehicle incorporating this invention.

Referring to FIG. 1, a vehicle shown generally at the numeral 10 is adapted to be pulled and powered by an auxiliary small, shunting type, diesel-electric locomotive. However, the vehicle 10 may also be self-powered.

The vehicle 10 is provided with wheels 14 similar to normal train wheels and adapted to ride along tracks 16, a cab 18 to house the operating personnel, two lasers of which one can be seen at 20, electric power supplies 22 for the two lasers, optical beam-transport systems 24 (only one seen in FIG. 1) for directing the beam onto the track 16, optical application heads 26 capable of splitting the beam, if required, to produce separated strips of repaired material on the tracks 16, a tank 28 to hold a quenching liquid such as oil or water, a liquid feed mechanism 30 located to the left of the head 26 (behind the head in the direction of travel), and a latching apparatus 38 by which the vehicle 10 can be connected to a locomotive to be pulled.

The power source in the pulling locomotive (or built into the vehicle 10 if desired) would preferably be a diesel-powered or gas-turbine electrical generator, of sufficient capacity to operate the lasers 20 and their associated peripheral equipment. The lasers 20 are typically high powered, continuous wave, carbon dioxide lasers, each capable of continuously producing an output beam power of 200 Kw or more. In addition, each laser may be fitted with plasma or arc augmentation equipment so as to provide additional energy for increasing the process speed. Also, the laser power may be increased by utilizing my burst-mode operation of a laser technique as described in U.S. Pat. No. 5,107,510.

For each laser, there is a beam transport and application system, the control of which is located inside the environmentally controlled cab 18. The beam transport tubes are used to conduct the intense beams from each laser to the respective rail surfaces. Each transport subsystem incorporates a cylindrical beam-integrator line-focusing unit, to provide the appropriate irradiance profile of the surface to be laser repaired. The design and construction of these beam systems provides for positional flexibility and rail tracking, adequate for continuous profiled illumination of the work piece.

Figure 2:
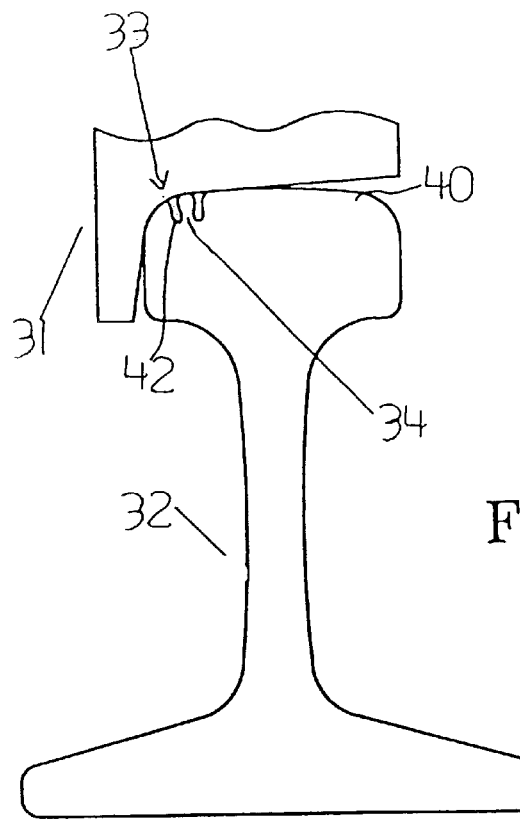
FIG. 2A and 2B are railway track profiles showing typical locations where rail repair can take place in accordance with this invention.
Figure 2:
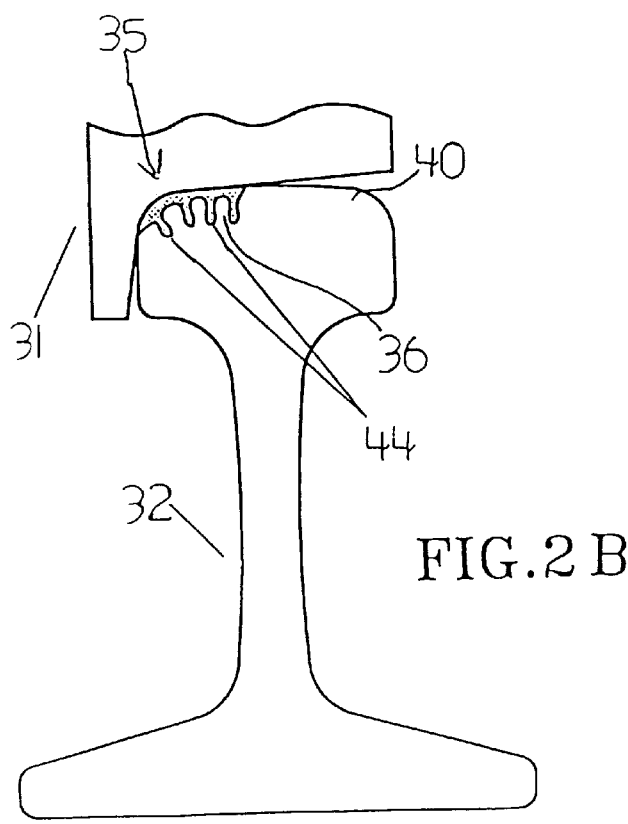

FIGS. 2A and 2B show the profile of a typical rail 32 and the shape of two regions 33 and 35 of melted and re-solidified material. Part of wheel 31 is shown to illustrate the contact area of the wheel on the rail. These regions 33 and 35 will extend along the length of the rail to the extent of the cracked zone, which can be located in advance with known techniques. The region 33 shown in FIG. 2A is made from two strips 42 of re-solidified metal with an unaffected zone 34 entirely separating them and locking the strips into the rail. In FIG. 2B, the region 35 is formed from a broad area of re-solidified metal and several roots 44 of metal extending deep within the rail, with the roots being separated and locked in by unaffected metal 36 between them. FIG. 2B shows the preferred embodiment of the invention.

Figure 4:
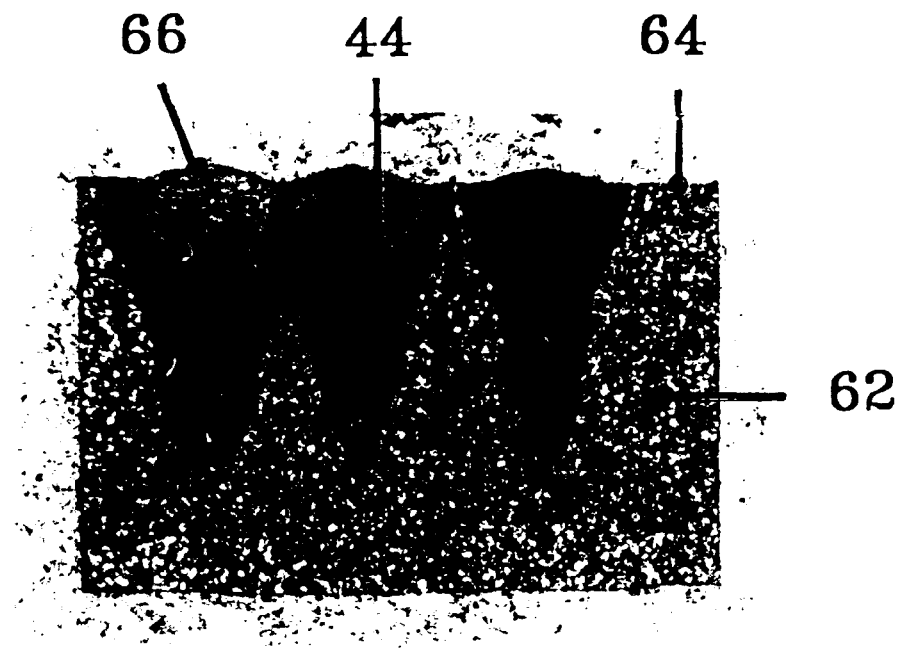
FIG. 4 is a metallographic cross-section of a laser treated rail head sample illustrating deep penetration alloying with multiple stripes "locked-in" to the surrounding bulk rail steel.

FIG. 4 shows a metallographic section of three roots 44 formed in the metal of a rail 62 using the techniques described in this patent document. The re-solidified metal is clearly shown as darker patches forming shapes rather like the roots of human teeth. Unaffected metal separates the roots from each other, and in the case of the root on the right, the unaffected metal extends almost all the way to the surface 64 of the rail. The upper portions 66 of the teeth are raised, and will form linear ridges that will need to be ground off.

Figure 5:
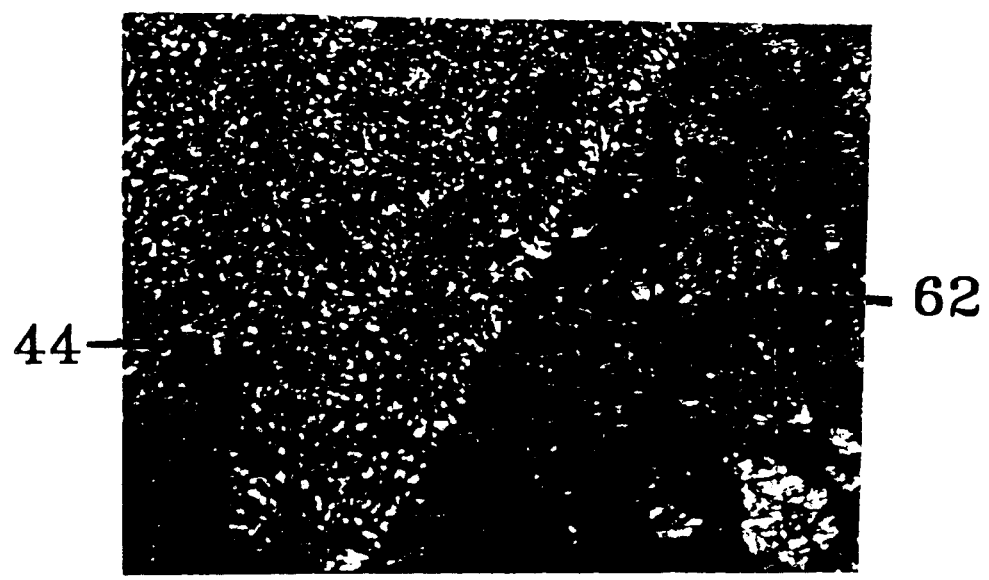
FIG. 5 is a high magnification metallographic cross-section of deep penetration laser alloyed rail sample showing the strong, high quality, fine grained microstructure of the alloyed material locked-in by the retained pearlite microstructure of the surrounding bulk rail material.

The roots 44 should extend at least below the affected zone, which will typically be in the first 5 mm of the rail, and preferably further so that the root extends between 7 and 10 mm into the rail and thus securely lock the re-solidified metal into the rail. An enlarged metallographic section shown in FIG. 5 illustrates the fine grained structure of the metal in the root 44 and also shows the typical pearlite structure of the metal of the rail 62.

In order to produce the plurality of roots or strips, several laser beams would have to be used, preferably by splitting a single beam optically. This can be done with conventional optics known in the field.

Figure 3:
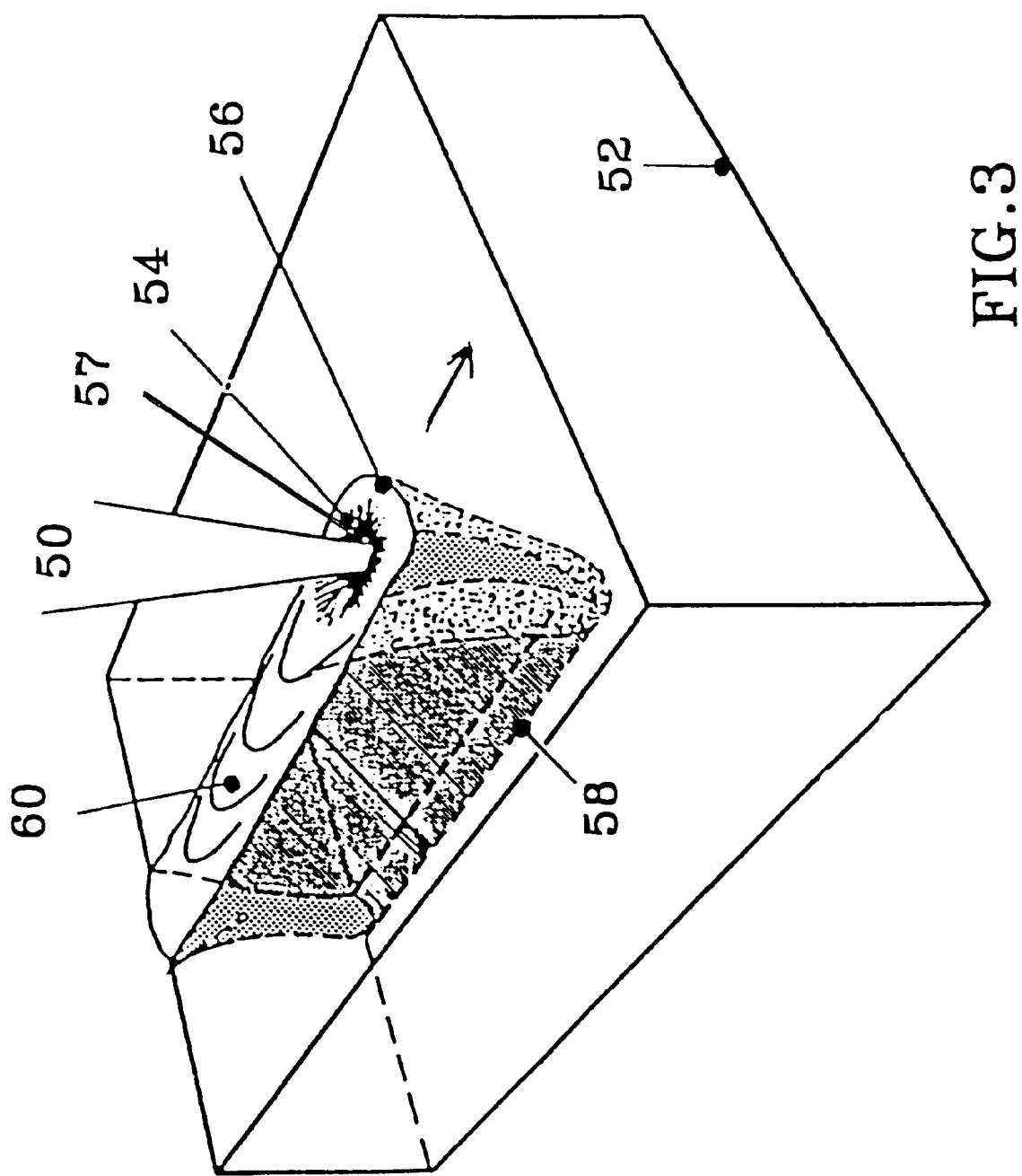
FIG. 3 is a schematic showing the effect of the focused laser radiation upon the metal in the rail head, featuring the deep penetration alloying wire feed directly into the vapor space.

FIG. 3 shows the operation of the vapour space effect that creates the deep roots 42 and 44. Laser beam 50 is focused on the metal block 52. The laser beam 50 vaporizes the metal at the focal point of the laser beam 50 to produce a vapour space 54. Metal vapor in the vapour space 54 prevents the vapour space 54 from collapsing, while the flow of liquid metal and surface tension tends to obliterate the vapour space 54. As the vapour space 54 moves, metal is continuously moved from ahead of the vapour space to behind the vapour space. Molten metal is shown at 56, while solidified metal is shown at 58. The ridges 60 in the molten metal may be removed by lightly grinding the rail. The depth of penetration of the vapour space 54 depends in part on the speed of the laser, so that the depth of melting may be readily controlled.

If desired, an additional piece 44 (FIG. 1) of apparatus may provide an alloying material 57 (FIG. 3) such as fusible wire or metallic powder simultaneously with the energy from the laser beam into the vapour space, so that the beam can alloy the wire or powder into the track. The wire 57 is inserted in the vapour space and the end of the wire melts, with the drops falling into the vapour space. It is believed desirable to mix as much alloying material as possible into the vapour space, and this will be facilitated by using a material with a low viscosity. Any excess may be removed in the grinding process.

To add alloying material to the vapour space, it is proposed to use a microprocessor controlled, wire-feeding Digi Pulse MIG machine (available from Linde, a division of Union Carbide) to deposit the alloying material as metal droplets directly into the vapor void and molten sidewalls of the vapor hole. It is believed that cracking may be eliminated if the alloying material forms a duplex microstructure upon solidification; rather than an austenitic or ferritic microstructure. Satisfactory results have thus been obtained with duplex stainless steel alloying elements. Ideally, the object is to match as closely as possible the microstructure of the existing rail, so that the re-solidified material is compatible with the existing rail (that is, having similar metallurgical characteristics). It is believed that a condition for compatibility of the alloying material with the rail metal is that the alloying material have a narrow temperature range in which the metal solidifies, such as is the case with duplex stainless steel. Fine grained pearlite is the preferred structure. Thus it is desired to have slower rates of cooling and to this end it may be desirable to pre-heat the entire rail to help slow down the rate of cooling.

It will be understood that the speed of the vehicle 10 is such as to move the beam longitudinally along the track at a speed which allows the irradiated part of the track to be heated to a temperature such that a given portion of the track vaporizes and becomes repaired after the beam has passed further along the track. In the case of the laser alloying the track through the use of a wire or metallic powder, the speed of the vehicle is such as to progressively move the beam and the powder feeding apparatus together longitudinally along the track at a speed which allows the wire or powder to be alloyed into the track in at least two continuous strips to form a hard and wear-resistant layer or channel that extends deep within the rail.

Creation of a vapour space results in about 90% absorption of the laser energy by the vapour, as compared with 50% absorption for molten metal and 10% absorption for unheated steel.

Cooling of the molten metal of the repaired rail should be at such a speed to avoid the production of excessive martensite, a crystalline form of steel. Martensite, while very hard wearing, is too brittle for it to form all of a steel rail, and may form if the melted rail hardens too quickly. Fine grained martensite may, however, be acceptable in some rails.

The structure illustrated in FIGS. 2B and 4, acts much like the root system of a tooth and thereby provides a much longer and non-uniform interface region between the alloyed channels and the unaltered ductile bulk rail steel. In this manner, the interface profile is much improved and thereby eliminates de-lamination problems. If this is not done, then the refurbished region soon peals out of the rail head, after considerable plastic flow has occurred due to the passage of heavily loaded wheels.

It is believed that extremely high levels of average laser power are required to achieve a commercially acceptable process. Specifically at least 200 kw of laser energy deposition into each rail head is necessary to achieve a process rate of near 1m/sec. This translates into about 50 kW per channel.

This figure therefore dictates an overall laser power requirement for a rail processing vehicle of at least 400 kW. Such figures are about a factor of 10 beyond the capabilities, in terms of attainable power, size, weight and cost, of any present day commercial laser. The inventor has demonstrated the invention using a 30 kW laser, which while it shows the results illustrated in FIGS. 4 and 5, does not have sufficient power for commercial operation.

On the other hand, the inventor believes that his own "Laser System With Multiple Radial Discharge Channels", described in the inventor's U.S. Pat. No. # 5,029,173 of the same title will be capable of achieving the required power, when used with a sufficiently large number of radial gain channels as described in that patent.

The process described lends itself very well to use with a self-propelled stand-alone vehicle of the kind described above in connection with FIG. 1. By providing the vehicle with a 90° swivelling capability and rubber wheels set at right angles to the rail wheels 14, so that it can quickly mount or dismount the railroad right-of-way at any grade level crossing, the laser rail hardening process can proceed almost continuously—interrupted only briefly as rail traffic periodically comes along. Alternatively, in track areas equipped with regularly spaced off sidings, the vehicle could merely stop at these points and allow the normal rail traffic to go by. In this case the vehicle does not require extra wheels to permit perpendicular movement at grade level crossings.

In heavily loaded and/or high traffic areas, subject to excessive wear, the repairing process could be repeated at regular intervals, thereby providing for an even greater extension of track lifetime.

The process is believed equally applicable to the metal of wheels for a rail vehicle, or indeed any metal subject to deep cracking.

Since the process does not require a highly focused beam, it follows that a high quality laser beam with well-defined or controlled mode shape is not necessary. Simple "beam integrator optics" could provide adequate uniformity of illumination, irrespective of the mode pattern.

Molten metal reacts with the ambient air and produces undesirable effects. To avoid these unwanted reactions, an inert cover-gas is required. An inexpensive nitrogen or carbon dioxide cover-gas is expected to be adequate.

Figure 6:
FIG. 6 is a metallographic cross-section of a laser treated rail sample exhibiting porosity.

FIGS. 6, 7, 8 and 9 show respectively the features that are believed to be avoided by using an alloying material. FIG. 6 shows porosity, FIG. 7 shows a chill crack defect, FIG. 8 shows a chill void defect and FIG. 9 shows a hot cracking defect. All of these defects are believed to be caused by the high sulphur and carbon content of the rail steel. To avoid these defects, the alloying material must be added to dilute the concentration of sulphur and carbon within the re-solidified zone.

Alternative Embodiments

A person skilled in the art could make immaterial modifications to the invention described and claimed in this patent without departing from the essence of the invention.

I claim:

1. A method of repairing cracks in the metal of a rail of a railway track or a wheel of a rail vehicle, the method comprising:

generating at least one intense beam of energy capable of generating a vapour space in the metal;

directing the intense beam of energy towards the cracks in the metal;

vaporising metal within the rail or wheel in the vicinity of the cracks to form a vapour space extending at least 5 mm into the rail or wheel;

moving the beam of energy along the rail or wheel at a speed such that the metal surrounding the cracks melts when the beam of energy is directed towards the metal and solidifies after the intense beam of energy moves on to form a narrow strip of melted and solidified metal; and depositing an alloying material within the vapour space to form a microstructure upon solidification of the alloying material that is compatible with the rail metal.

2. The method of claim 1 in which the alloying material is a duplex stainless steel.

3. The method of claim 1 in which a plurality of intense beams of energy are directed towards the rail or wheel to form a plurality of strips of metal having roots extending into the metal of the rail or wheel at least 7 mm, the roots being separated by unaffected strips of metal that lock the strips within the rail or wheel.

4. The method of claim 1 in which a plurality of intense beams of energy are directed towards the rail or wheel to form a plurality of stripe of metal having roots extending into the metal of the rail or wheel, the roots being separated by unaffected strips of metal that lock the strips within the rail or wheel.

* * * * *